United States Patent Office 3,504,615
Patented Apr. 7, 1970

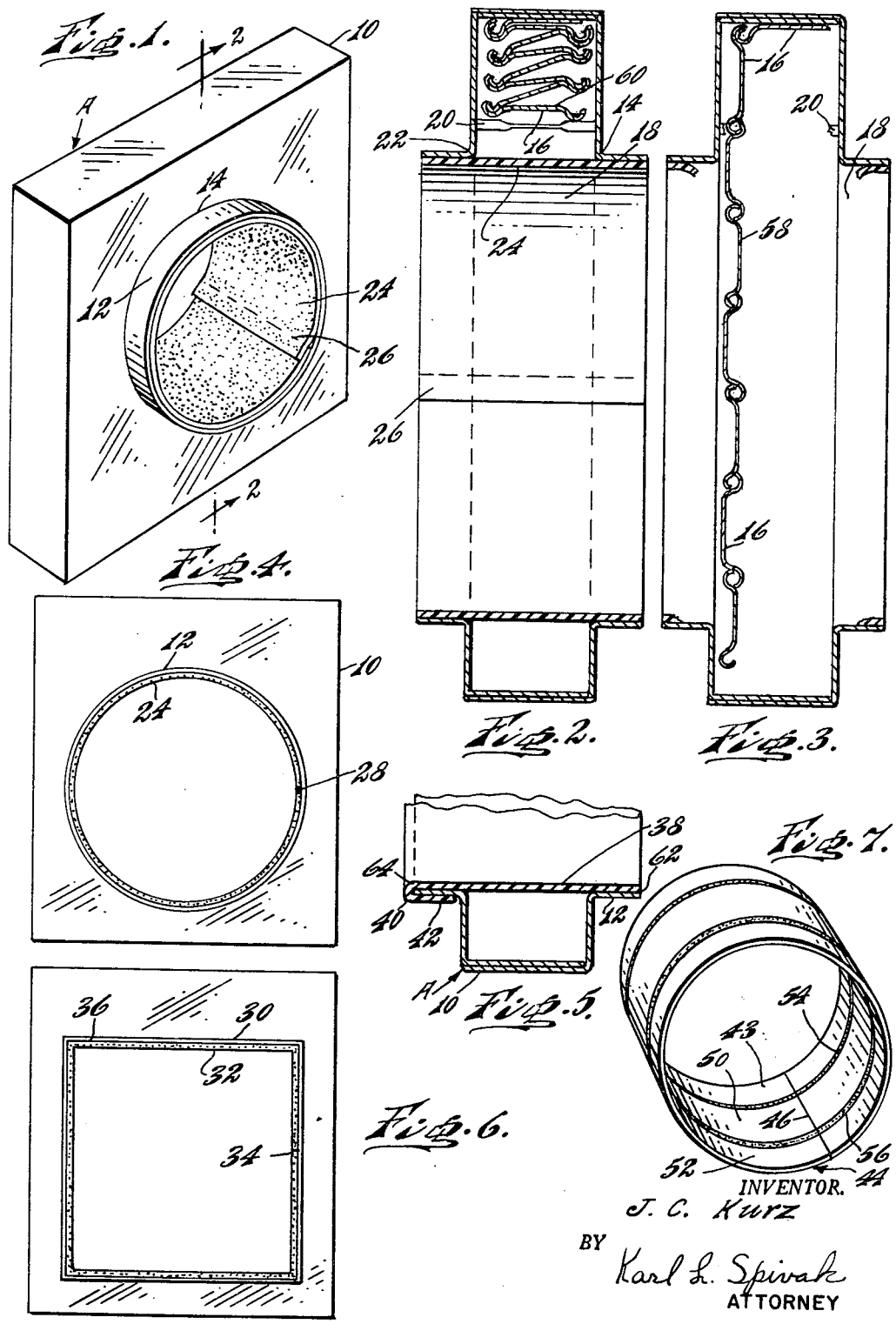

3,504,615
NONTURBULENT FIRE DAMPER
John C. Kurz, Philadelphia, Pa., assignor to Air Balance, Inc., Philadelphia, Pa., a corporation of Pennsylvania
Filed June 7, 1968, Ser. No. 735,472
Int. Cl. F16k 13/04
U.S. Cl. 98—1
12 Claims

ABSTRACT OF THE DISCLOSURE

A nonturbulent fire damper for use in high pressure air duct systems including a plurality of fire resisting damper blades maintained in open position by a fusible element and mounted exteriorly of the air stream and a heat disintegrating cover mounted upon the fire damper construction about the periphery of the air stream, said cover serving to shield the damper blades and the fusible element from impingement by the air stream travelling within the said duct system.

---

This invention relates in general to the field of building construction and more particularly, is directed to a novel type of fire damper wherein noise and vibration within an air duct system may be minimized and wherein the efficiency of the air system is unimpaired.

In the erection of modern buildings for office, industrial, commercial and other uses, it is common practice in the present construction industry to provide complex air handling systems within the building during the design and construction stages of the work. Such systems find utility in heating, ventilating, air conditioning and certain industrial and process applications. The air conditioning installations far exceed all others in number, size and dollar volume of construction and so the novel damper as referred to in the instant application will be discussed as it relates to the air conditioning industry. However, it should be borne in mind that the application and principles herein set forth are equally applicable when desired in other air handling systems and may be readily so employed.

Duct systems for air handling purposes have traditionally been constructed in buildings for many decades and such systems in the past have formed a basis for considerable engineering research and technical improvements. Optimum operating speeds and conditions have been designed for both supply and return ducts and for many years, systems have conventionally been designed according to the established criteria. More recently, however, in the interest of saving construction costs by reducing the size of duct work and thereby reducing the overall volumetric requirements of a building, duct systems have been employed wherein the velocity of both supply and return air systems have been considerably accelerated. As a necessary function of the increase in the air speed of travel, the static pressures within duct systems have also considerably increased, thereby creating certain system operating difficulties.

High pressure duct systems are now being employed wherein air is impelled at many times the speed of former system designs. It can be appreciated that the quantity of air moving in a given air handling system equals the product of the velocity of the system times the cross sectional area of the duct work. It is thus observed that the size of the duct itself is a direct function of the speed and therefore, the duct size may be reduced as the velocity is increased in a straight line relationship. The high pressure systems can thus result in considerable savings in duct and building erection costs without sacrificing quantity or quality of the air conditioning installation or without unduly adversely affecting the installation cost of construction.

However, it has been found that when the air velocity is increased as in the high pressure air handling systems, the very speed of air travel causes ancillary problems such as noise, vibration and turbulence. Such factors may be quite evident at elbows, air outlets, transition pieces and in other duct obstructions. One area that has heretofore presented extreme difficulties in this regard to engineers and high pressure air conditioning system designers is the location where the design of the building itself requires the need for installation of fire dampers. Such areas include locations where duct work passes through fire walls and fire partitions, where the duct work enters mechanical rooms and wherein the same duct will be utilized to serve one or more separate occupancies. In such locations, most building codes and other safety standards require the installation of a fire damper to prevent the possible spread of heat and flame from one fire division area to another through the duct work itself. Fire dampers heretofore have universally been employed for safety from fire considerations at the critical locations designated in safety standards. In conventional, low velocity systems, the installation of fire dampers at the critical areas presented no particular problems in that the relatively slow speed of the travel of air through the duct work did not cause undue vibration, noise, or other discomfort. However, when such dampers were employed in high velocity duct systems, all of the problems of vibration, noise and turbulence became readily apparent as soon as the high speed air stream impinged upon the damper construction.

Prior workers in the field have attempted to solve this difficulty by using air insulating materials in conjunction with the fire dampers in an effort to deaden any sounds generated by the passage of the air. Such materials as felt, foam plastic and the like have been employed, but generally these prior art efforts have produced very poor results. Other workers skilled in the trade have attempted to solve the problem by constructing elements extending exteriorly of the duct work to contain the working fire damper elements exteriorly of the main air stream to thereby prevent impingement of the air stream itself upon the fire damper construction. Such designs have resulted in increased efficiency and have reduced the problem of vibration and noise to a considerable degree. However, in view of the high static pressures generated within a high pressure air system, a portion of the air stream does in fact expand into the exterior damper space thus provided to thereby create noise and vibration problems, even though at a reduced scale.

The instant invention seeks to overcome the difficulties encountered by prior workers in the art by providing a shield over the operating elements of fire dampers mounted within a high pressure air duct system and by providing means wherein the shield automatically disintegrates upon the presence of heat to thereby expose the functioning portions of the fire damper for operation and action as designed and as necessary to prevent the spread of fire through a duct system.

It is therefore an object of the instant invention to provide an improved non-turbulent fire damper of the type set forth.

It is a further object of the instant invention to provide a non-turbulent fire damper suitable for use within a high velocity air duct system.

It is another object of the instant invention to provide a non-turbulent fire damper wherein all operating portions are retained outside of the main air stream.

It is another object of the instant invention to provide a non-turbulent fire damper wherein the operating portions are maintained outside of the main air stream of a high pressure duct system and wherein the operating portions are shielded from contact with the air stream.

It is another object of the instant invention to provide a non-turbulent fire damper including heat sensitive shielding means.

It is another object of the instant invention to provide a non-turbulent fire damper wherein the operating elements are mounted without the air stream and wherein a heat sensitive, automatically disintegrating shield is interposed between the damper elements and the air stream.

It is another object of the instant invention to provide a non-turbulent fire damper suitable for use both with systems of rectangular configuration and circular configuration and wherein shielding means are interposed between the fire damper operating elements and the air stream whereby the air stream cannot impinge upon the fire damper elements.

It is another object of the instant invention to provide a non-turbulent fire damper which incorporates a readily heat ignitable material interposed between the operating elements of the fire damper and the main air stream.

It is another object of the instant invention to provide a non-turbulent fire damper that is inexpensive in manufacture, rugged in construction and trouble-free in operation.

Other objects and a fuller understanding of the invention will be had by referring to the following description and claims of a preferred embodiment thereof, taken in conjunction with the accompanying drawing wherein like characters refer to similar parts throughout the several views and in which:

FIG. 1 is a perspective view of the invention.

FIG. 2 is a cross-sectional view taken along line 2—2 of FIG. 1, looking in the direction of the arrows.

FIG. 3 is a cross-sectional view taken along line 2—2 of FIG. 1 showing the position of the damper blades after the fusible link has melted.

FIG. 4 is a front elevational view of the invention.

FIG. 5 is a partial sectional view similar to FIG. 2, showing a modified shield construction.

FIG. 6 is a front elevational view of a modification of the invention.

FIG. 7 is a perspective view of a modified shield.

Although specific terms are used in the following description for the sake of clarity, these terms are intended to refer only to the particular structure of my invention selected for illustration in the drawing and are not intended to define or limit the scope of the invention.

Referring now to the drawing, I show in FIG. 1 a fire damper assembly A designed and constructed in accordance with the requirements for noiseless and vibrationless operation within a high pressure air duct system (not shown) of a building air conditioning system. As illustrated, the fire damper assembly comprises a substantially rectangular sheet metal enclosure 10 axially carrying a sheet metal collar 12 of circular construction and extending forwardly and rearwardly therefrom for duct connecting purposes. Peripheral, air tight junctions 14, 22 of required rigidity and strength to adequately support the weight of the assembly A when applied to an air duct system respectively connect the collar 12 to the front and rear walls of the enclosure 10.

As can be seen by referring to FIGS. 2 and 3 the enclosure 10 operatively carries a plurality of fire damper blades 16 of the horizontal interlocking type for function within the air duct system. The blades 16 interfold as illustrated in FIG. 2 when in the open position 60 and are secured outside of the air stream 18 in conventional manner by a fusible element 20 which is designed to melt upon application of a given temperature, for example 145 degrees F., in accordance with well established principles.

Upon application of sufficient heat to melt the fusible element 20, the blades 16 unfold to the closed position 58 and drop vertically within the enclosure 10 to substantially obstruct the air stream 18 as defined by the collar 12, as best illustrated in FIG. 3.

Referring now to FIGS. 1 and 2, a heat sensitive shield 24 interiorly affixes to the collar 12 to provide a smooth conduit for the air stream 18 as it passes through the fire damper assembly A, thereby effectively isolating the damper blades 16 and fusible element 20 from direct contact with the air stream. The shield 24 attaches to the collar 12 by utilization of a peripheral application of a suitable adhesive as required to bind the shield material to the collar construction. The shield comprises a single length of heat sensitive material bent to a cylindrical configuration as illustrated. A lap joint 26 as illustrated in FIG. 1 or a butt joint 28 as shown in FIG. 4, closes the shield 24 in a cylindrical configuration. The heat sensitive shield must be fabricated from a material having physical properties that cause it to completely deform at a temperature less than 145 degrees F. in such a manner that the material will rapidly drop away from the fusible element 20 upon the introduction of sufficient heat in the duct system. In this manner, in the event that temperatures within the duct system rise to a dangerous level, such as might occur due to the presence of a fire, the heat sensitive shield 24 would thus deform and drop away from the collar 12. The fusible element 20 would thus be exposed to operate the damper blades in the usual manner and in accordance with the fire damper design to prevent the spread of fire and heat through the duct system.

Sheets of clear cellulose nitrate of .005 inch thickness have been tested and have proved suitable for this purpose. Such composition is commonly referred to as pyroxylin plastic material, a material well known for its sensitivity of heat and flame. The composition is readily ignitable and will thus quickly oxidize to permit rapid, unrestricted operation of the fire damper blades immediately upon sensing the presence of sufficient heat for fire damper operation. In addition, the heat generated by oxidation of the shield aids in supplying sufficient heat to melt the fusible link 20 quickly.

In FIG. 6, a fire damper assembly is illustrated including a rectangular blade enclosure 10 and a rectangular collar 30 affixed thereto in the usual manner for connection to and operation with a conventional rectangular duct system (not shown). A heat sensitive shield 32 comprising a length of pyroxylin plastic material formed to a rectangular configuration and joined in a butt joint 34 as previously described protects the blades 16 from impingement by the air stream. The plastic shield 32 adheres to the interior construction of the collar 30 by means of a suitable adhesive material to provide an air-tight, peripheral junction 36 whereby the air moving within the duct system (not shown) flows interiorly of the shield 32 without objectionable turbulence, vibration, whistling or other noise.

In the modification illustrated in FIG 5, a circular collar 12 peripherally affixes to the blade enclosure 10 in the usual manner for connection to a duct system (not shown) for interference-free transmission of the air stream 18 travelling in the direction of the arrow as illustrated. A peripheral shield 38 of heat sensitive material as hereinbefore described peripherally adheres to the interior of the collar 12 on the downstream side using a suitable adhesive 62 in well-known manner. The shield 38 terminates upstream, in a peripheral, overturned lip 40 which encompasses the upstream edge of the collar 12 to thereby provide a flush, smooth entrance for the air stream into the fire damper assembly A. This construction substantially eliminates all possibility of vibration and noise caused by impingement of the air stream upon the plastic shield, inasmuch as a smooth, rounded, peripheral edge 64 is provided. The overturned lip 40 may be employed with ducts of circular construction as in FIG. 4 or with ducts of rectangular construction as in FIG. 6 with equal applicability and utility. After the shield 38 is positioned, the duct (not shown) may be readily applied over the exposed leg 42 of the lip 40 as required for a sturdy and airtight juncture using well-known duct connection techniques.

Referring now to FIG. 7, a modified shield 44 of cylindrical configuration, closed in a butt joint 46, is illustrated. The shield 44 comprises three cylindrical juxtaposed shields 48, 50, 52 constructed of non-flammable material such as sheet metal and peripherally joined together by spaced, circular, narrow bands 54, 56 of heat sensitive pyroxylin plastic material affixed thereto by suitable adhesive. The outermost shields 48, 52 peripherally affix to the interior lateral edges of the collar in the manner hereinbefore described for the shield 24.

The narrow bands 54, 56 respond to the pressure of heat in the manner described for the shield 24 and readily ignite at temperatures less than that required to fuse the element 20. The oxidation of the pyroxylin bands 54, 56 frees the central shield 50 from its bonds with the shield 50 to drop freely to the bottom of the enclosure 10. In this manner, the thus exposed fusible element 20 functions in the usual manner to release the damper blades 16 for normal fire damper operation. The bottom 68 of the enclosure 10 may be enlarged as required to receive the freed central shield 50 to avoid interference with operation of the damper blades 16 as they fall to the closed position 58.

Although I have described my invention with a certain degree of particularity, it is understood that the present disclosure has been made only by way of example and that numerous changes in the details of construction and the combination and arrangement of parts may be resorted to without departing from the spirit and scope of the invention as hereafter claimed.

What is claimed is:
1. In a fire damper suitable for use within an air handling system, carrying pressurized air stream, the combination of
(A) exteriorly an enclosure,
  (1) said enclosure being adaptable for installation within the said air handling system,
  (2) said enclosure including portions extending exteriorly of the said air handling system;
(B) fire damper blades carried by the said enclosure,
  (1) said blades being movable from a first position to a second position in response to the presence of heat,
    (a) said blades being carried exteriorly of the said air stream when in the first position,
    (b) said blades obstructing the said air stream when in the second position;
(C) collar means affixed to the said enclosure for securing to the said air handling system,
  (1) said means defining a channel for the said air stream through the enclosure; and
(D) shielding means interiorly affixed to the said collar means,
  (1) said shielding means forming a smooth conduit for the passage of the said air stream,
  (2) said shielding means isolating the damper blades when in said first position from the said air stream.

2. The invention of claim 1 wherein the said shielding means include deformable means.

3. The invention of claim 1 wherein the said shielding means, said deformable means being sensitive to the presence of heat.

4. The invention of claim 1 wherein the said shielding means, said deformable means deforming at a temperature of less than 145 degrees F., whereby the said damper blades are exposed to move from said first position to the said second position.

5. The invention of claim 1 wherein the said shielding means include smooth, rounded means facing the said air stream.

6. The invention of claim 1 wherein the said shielding means are fabricated of materials from the class cellulose nitrate.

7. The invention of claim 1 wherein the said shielding means include fixed members and deformable members.

8. The invention of claim 1 wherein the said shielding means include fixed members and deformable members, said deformable members being responsive to the presence of heat.

9. The invention of claim 1 wherein the said shielding means include fixed members and deformable members, said deformable members being responsible to the presence heat, said deforable members deforming at a temperature of less than 145 degrees F.

10. The invention of claim 1 wherein the said shielding means include both combustible and non-combustible elements.

11. The invention of claim 1 wherein the said shielding means include both combustible and non-combustible elements, said combustible elements comprising a pair of spaced rings, said rings respectively joining spaced said non-combustible elements.

12. The invention of claim 1 wherein the said shielding means include both combustible and non-combustible elements, said non-combustible elements comprising a plurality of juxtaposed cylindrical elements, said combustible elements comprising a plurality of pyroxylin plastic rings, the said rings respectively joining the said cylindrical elements.

References Cited
UNITED STATES PATENTS 3,172,347   3/1965   Johnson _____ 98—1

WILLIAM E. WAYNER, Primary Examiner

U.S. Cl. X.R.
137—74